United States Patent Office 3,376,256
Patented Apr. 2, 1968

3,376,256
POLYVINYL CHLORIDE STABILIZED WITH METAL SALTS OF ACYCLIC POLYCARBOXYLIC ACIDS
Peter P. Klemchuk, Yorktown Heights, N.Y., assignor to Geigy Chemical Corporation, Greenburgh, N.Y., a corporation of Delaware
No Drawing. Original application June 11, 1962, Ser. No. 201,255, now Patent No. 3,305,568, dated June 21, 1967. Divided and this application Oct. 18, 1966, Ser. No. 598,565
1 Claim. (Cl. 260—45.75)

This application is a division of my co-pending application Ser. No. 201,255, filed on June 11, 1962, now U.S. Patent 3,305,568.

This invention relates to certain new and useful salts of tetravalent tin. The invention also relates to the novel salts of similar usefulness containing zinc, calcium, cadmium or barium.

Specifically, the invention concerns metallic salts of acids of the Formulae I, II and III:

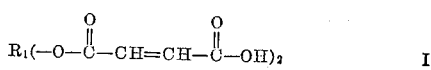

wherein $R_2$ may be 1,1,1-tri-(lower alkylene)-lower alkane, e.g., 1,1,1-trimethylene-propane,
ylpropylene, methylbutylene—alkenylene having 2 to 6 carbon atoms—e.g. 2-butenylene, propenylene, 2-methyl-propenylene—1,4-dimethylene-cyclohexane,

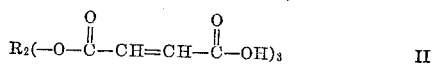

wherein $R_2$ may be 1,1,1-tri-(lower alkylene)-lower alkane, e.g. 1,1,1-trimethylene-propane,

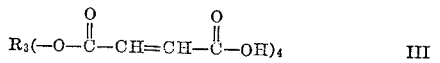

wherein $R_3$ is 1,1,1,1-tetra-(lower alkylene)-methane, e.g. 1,1,1,1-tetramethylene-methane.

Especially valuable are the zinc, calcium, cadmium, barium and dialkyltin salts of the acids of the Formulae I, II and III.

The aforesaid salts of acids of the Formulae I, II and III show surprisingly good stabilizing properties for resins containing polyvinyl chloride, e.g. especially against thermal and light-induced degradation.

Examples of useful dialkyltin salts of the acids of the Formulae I, II and III are illustrated by the following: dimethyltin, diethyltin, dipropyltin, dibutyltin, dipentyltin, dihexyltin, and dioctyltin. Normal alkyl groups are preferred, as are the lower alkyl groups.

Mixtures of the stabilizers of the invention may also be very useful in stabilizer systems for polyvinyl chloride resinous compositions. Moreover, the stabilizers of the invention can be used also in combination with other stabilizers, antioxidants, ultraviolet light absorbers, dyes, pigments, fillers, antistatic agents, plasticizers, etc.

The stabilizers of the invention are incorporated into the unstable material in conventional ways, and amounts of stabilizers may fluctuate from 0.01% to 10% by weight, based on the unstabilized polymer composition.

The stabilizers of the invention are prepared from the appropriate partial ester and a suitable base containing the desired divalent metal grouping. Thus, for example, dialkyltin oxides are useful for reaction with ethylene bis(β-carboxyacrylate). Calcium oxide, cadmium oxide, zinc oxide, and barium hydroxide are also usefully employed, preferably in aqueous media.

The following examples are illustrative of the invention, but there is no intention to limit the same thereto. In the examples, parts are by weight, unless otherwise indicated, and the relationship between parts by weight and parts by volume is as that between grams and cubic centimeters. Temperatures are in degrees centigrade.

Example I.—Dibutyltin salt of ethylene bis(β-carboxyacrylate)

Ethylene glycol (24.8 parts) and 78.4 parts of maleic anhydride are heated on the steam bath for 1 hour. The resulting viscous liquid has a neutralization equivalent of 124 (theory, 129). To this liquid is added 49.8 parts of dibutyltin oxide and 100 parts by volume of toluene. Then, the resulting mixture is heated at reflux and the water is removed as the azeotrope with toluene. The reaction solution is filtered and concentrated to dryness in vacuo, so that the so-obtained dibutyltin salt of ethylene bis(β-carboxyacrylate) has a tin analysis of 23.3% (24.2, theory).

Example II.—Cadmium salt of ethylene bis(β-carboxyacrylate)

The product from the reaction of ethylene glycol and maleic anhydride carried out as in Example I above, is reacted with a slight excess of cadmium oxide in an aqueous solution. After one hour of stirring this reaction mixture, the solution is filtered and the product, cadmium salt of ethylene bis(β-carboxyacrylate), is isolated from the filtrate by concentration to dryness under vacuum. The light yellow solid product has an analysis of 32.14% cadmium (theory, 30.5%).

Example III.—Zinc salt of ethylene bis(β-carboxyacrylate)

The product from the reaction of ethylene glycol and maleic anhydride carried out as in Example I is reacted in aqueous solution with a slight excess of zinc oxide. After one hour of stirring, the reaction mixture is filtered and the product, zinc salt of ethylene bis(β-carboxyacrylate), is isolated from the filtrate by concentration under vacuum. The colorless product is a solid containing 20.11% zinc (theory, 20.4%).

Example IV.—Calcium salt of ethylene bis(β-carboxyacrylate)

The calcium salt of ethylene bis(β-carboxyacrylate) is prepared with calcium oxide in place of zinc oxide, in the same manner as described in Example III above, yielding a colorless solid product having a 12.42% calcium content (theory, 13.5%).

Example V.—Barium salt of ethylene bis(β-carboxyacrylate)

The barium salt of ethylene bis(β-carboxyacrylate) is prepared with a solution of barium hydroxide in the same manner as the zinc salt described in Example III above.

Example VI.—Dibutyltin salt of 1,2-propylene bis(β-carboxyacrylate)

1,2-propylene glycol (7.6 parts) and 19.6 parts of maleic anhydride are heated on the steam bath for 3 hours. The product has a neutralization equivalent of 130 (theory, 136). To the liquid product are added 24.89 parts of dibutyltin oxide and 50 parts by volume of toluene. The reaction mixture is heated at reflux and water is removed from the distillate. The resulting solution is filtered and concentrated to dryness in vacuo. The dibutyltin salt of 1,2-propylene bis(β-carboxyacrylate) so obtained has a tin content of 23.31% (theory, 23.59%).

Example VII.—Calcium salt of 1,2-propylene bis(β-carboxyacrylate)

The product from the reaction of 1,2-propylene glycol and maleic anhydride carried out as in Example VI is reacted in aqueous solution with the theoretical amount of calcium oxide. After stirring for 1 hour the reaction mixture is filtered. The product is isolated from the filtrate by concentration under vacuum. The pale yellow solid has a calcium content of 12.80% (12.9%, theory).

Example VIII.—Zinc salt of 1,2-propylene bis($\beta$-carboxyacrylate)

The zinc salt is prepared as the calcium salt in Example VII using zinc oxide. The colorless solid product has a zinc content of 20.18% (19.5%, theory).

Example IX.—Cadmium salt of 1,2-propylene bis($\beta$-carboxyacrylate)

The cadmium salt is prepared as the calcium salt in Example VII using cadmium oxide. The colorless solid product has a cadmium content of 30.48% (29.9%, theory).

Example X.—Dibutyltin salt of 1,3-butylene bis($\beta$-carboxyacrylate)

1,3-butylene glycol (9.0 parts) and 19.6 parts of maleic anhydride are heated on the steam bath for 4 hours. The product's neutralization equivalent is 139.5 (143, theory). To this product are added 24.89 parts of dibutyltin oxide and 50 parts by volume of toluene and the reaction mixture is then heated at reflux, water being removed from the distillate. The resulting solution is filtered and concentrated to dryness in vacuo. The dibutyltin salt, 1,3-butylene bis($\beta$-carboxyacrylate) has a tin content of 22.80% (22.95, theory).

Example XI.—Dibutyltin salt of 1,4-butylene bis($\beta$-carboxyacrylate)

This salt is prepared exactly as described for the 1,3-isomer of Example X above, except that only one hour's heating on the steam bath is required. The acid-ester has a neutralization equivalent of 141 (143, theory). The dibutyltin salt prepared from the acid-ester has a tin content of 22.70% (22.95%, theory).

Example XII.—Calcium salt of 1,4-butylene bis($\beta$-carboxyacrylate)

The product from the reaction of 1,4-butylene glycol and maleic anhydride carried out as in Example XI is reacted in aqueous solution with the theoretical amount of calcium oxide. After stirring for 1 hour the reaction mixture is filtered. The product is isolated from the filtrate by concentration under vacuum. The solid product has a calcium content of 11.68% (12.36%, theory).

Example XIII.—Zinc salt of 1,4-butylene bis($\beta$-carboxyacrylate)

The zinc salt is prepared with zinc oxide in similar fashion as the calcium salt is prepared in Example XII. The solid product has a zinc content of 18.84% (18.70%, theory).

Example XIV.—Dibutyltin salt of 1,1,1-propanetrimethylene tris($\beta$-carboxyacrylate)

1,1,1-trimethylolpropane (6.7 parts) and 14.7 parts of maleic anhydride are heated on the steam bath for 4 hours. The product has a neutralization equivalent of 143 (143, theory). To this product are added 18.67 parts of dibutyltin oxide and 50 ml. of toluene and the reaction mixture is heated at reflux, water being removed as the azeotrope. The resulting solution is filtered and concentrated to dryness under vacuum. The resulting tin salt of the partial ester of maleic acid and 1,1,1-trimethylolpropane has a tin content of 22.95% (22.98%, theory).

Example XV.—Dibutyltin salt of 1,4-but-2-enylene bis($\beta$-carboxyacrylate)

2-butene-1,4-diol (44.0 parts) and 98.0 parts of maleic anhydride are heated on the steam bath for 30 min. The resulting product has a neutralization equivalent of 132 (142, theory). To this product are added 124.5 parts of dibutyltin oxide and 375 parts by volume of toluene. The reaction mixture is heated at reflux and water is removed from the distillate. The resulting solution is filtered and concentrated to dryness under vacuum. The resulting tin salt of the partial ester of maleic acid and 2-butene-1,4-diol has a tin content of 21.57% (23.1%, theory).

Example XVI.—Dibutyltin salt of 1,4-cyclohexanedimethylene bis($\beta$-carboxyacrylate)

1,4-dihydroxymethylcyclohexane (28.4 parts) and 38.8 parts of maleic anhydride are heated on the steam bath for one hour. The resulting colorless solid has a neutralization equivalent of 166 (170, theory); M.P. 129–138°. To 17 parts of the colorless salt are added 12.45 parts of dibutyltin oxide and 50 parts by volume of toluene. The reaction mixture is heated at reflux and water is removed from the distillate. The solution is filtered and concentrated to dryness under vacuum. The resulting colorless solid salt of the partial ester of maleic acid and 1,4-dihydroxymethylcyclohexane has a tin content of 19.9% (20.8%, theory).

Example XVII.—Dibutyltin salt of methanetetramethylene tetrakis ($\beta$-carboxyacrylate)

13.6 parts of pentaerythritol and 39.2 parts of maleic anhydride are heated on the steam bath for 2 hours. To the resultant product are added 49.8 parts of dibutyltin oxide and 100 parts by volume of toluene and the reaction mixture is then heated at reflux, water being removed from the distillate. The resulting solution is filtered and concentrated to dryness in vacuo.

Example XVIII.—Stabilized polyvinyl chloride

A sample of stabilized resin is prepared by milling for 10 minutes at 165° 100 parts of polyvinyl chloride resin 2 parts of the dibutyltin salt of ethylene bis($\beta$-carboxyacrylate), the so-stabilized resin being protected against thermal instability as evidenced by tests in the forced draft oven at measured intervals and constant temperature of 190°. The stabilized resin is compared to a blank for development of color due to thermal instability and rated according to the Gardner Color Scale. After a quarter hour the stabilized resin has a Gardner Color rating of 2, while the blank has a Gardner Color rating of 16. The blank fails after one half hour, while the above stabilized resin still has a Gardner Color rating of 2.

If, in the same manner, 2 parts per hundred of each of the following stabilizers is incorporated singly into polyvinyl chloride resin, then stabilization against thermal degradation is obtained:

Dibutyltin salt of 1,2-propylene bis($\beta$-carboxyacrylate)
Cadmium salt of 1,4-butylene bis($\beta$-carboxyacrylate)
Cadmium salt of 1,2-propylene bis($\beta$-carboxyacrylate)
Dibutyltin salt of 1,3-butylene bis($\beta$-carboxyacrylate)
Dibutyltin salt of 1,4-butylene bis($\beta$-carboxyacrylate)
Dibutyltin salt of 1,1,1-propanetrimethylene tris($\beta$-carboxyacrylate)
Dibutyltin salt of 1,4-but-2-enylene bis($\beta$-carboxyacrylate)
Dibutyltin salt of 1,4-cyclohexanedimethylene bis($\beta$-carboxyacrylate).

What is claimed is:

1. A composition of matter comprising a polymer of vinyl chloride and from 0.01% to 10% by weight, based on the polymer, of a salt of
    (a) an acidic moiety derived from an acid selected from the group consisting of
        (i) a compound of the formula

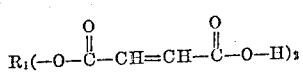

wherein $R_1$ is selected from the group consisting of alkylene having 2 to 6 carbon atoms, alkenylene having 2 to 6 carbon atoms, and 1,4-dimethylene-cyclohexane, (ii) a compound of the formula

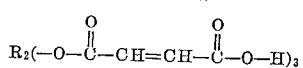

wherein $R_2$ is 1,1,1 - tris(lower alkylene)lower alkane, and (iii) a compound of the formula

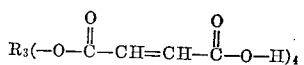

wherein $R_3$ is 1,1,1,1-tetrakis(lower alkylene) methane, and (b) a metallic moiety selected from the group consisting of zinc, calcium, cadmium, barium and di(lower alkyl)tin.

References Cited

UNITED STATES PATENTS

| | | | |
|---|---|---|---|
| 2,715,111 | 8/1955 | Weinberg | 260—45.4 |
| 2,795,570 | 6/1957 | Fuchs et al. | 260—45.75 |

DONALD E. CZAJA, *Primary Examiner.*

V. P. HOKE, *Assistant Examiner.*

UNITED STATES PATENT OFFICE
CERTIFICATE OF CORRECTION

Patent No. 3,376,256                        April 2, 1968

Peter P. Klemchuk

It is certified that error appears in the above identified patent and that said Letters Patent are hereby corrected as shown below:

Column 1, lines 26 and 27, "wherein $R_2$ may be 1,1,1-tri-(lower alkylene)-lower alkane, e.g., 1,1,1-trimethylene-propane" should read -- wherein $R_1$ may be alkylene having 2 to 6 carbon atoms—e.g. ethylene, propylene, butylene, methylethylene, meth- --.

Signed and sealed this 23rd day of September 1969.

(SEAL)
Attest:

Edward M. Fletcher, Jr.
Attesting Officer

WILLIAM E. SCHUYLER, JR.
Commissioner of Patents